Patented Oct. 17, 1939

2,176,516

UNITED STATES PATENT OFFICE 2,176,516

POLARIZING LAYER

Gustav Wilmanns, Wolfen, Kreis Bitterfeld, and Wilhelm Schneider, Dessau, Anhalt, Germany, assignors, by mesne assignments, to Agfa Ansco Corporation, Binghamton, N. Y., a corporation of Delaware No Drawing. Application May 21, 1937, Serial No. 143,934. In Germany June 12, 1936

5 Claims. (Cl. 88—65)

Our present invention relates to polarizing layers particularly used as a filter absorbing disturbing reflections in the photographic exposure.

One of its objects is to provide an improved polarizing layer containing metal salt, bromine or iodine addition products of 5- or 6-membered heterocyclic nitrogen bases. Further objects will be seen from the detailed specification following hereafter.

Layers which polarize light are made by embedding an iodine addition product of quinine disulphate (Herapathite) or of a sulfate of related alkaloids in acetyl cellulose or nitro-cellulose (U. S. Patent 1,951,664, dated March 20, 1934).

By this invention there are applied for this purpose simpler heterocyclic nitrogen bases which yield with iodine strongly double refracting addition compounds. Especially useful are the pyridine compounds, for example picoline, quinoline, quinaldine, also the 5-membered heterocyclic nitrogen bases, for instance imidazoles, oxazoles, indoles, thiazoles, and selenazoles. These substances surpass Herapathite in respect of double refraction, facility of crytallization and solubility.

It has also been observed that not only iodine, but also bromine and metal salts, particularly heavy metal salts, for instance salts of copper and iron, may be added to these bases and that the bodies produced by this addition also exhibit double refraction.

The quaternary ammonium salts of the aforesaid products, for instance alkyl halides, and alkyl sulfates, have particularly favorable properties, since they far exceed in stability the ordinary salts of the addition compounds. It follows that in the use of quaternary ammonium compound as compared with the known material a twofold effect, namely greater activity and improved durability, is obtained and with it a considerable technical progress.

The following examples illustrate the invention:

(1) 0.55 gram of 2.5-diphenyl oxazole of the formula

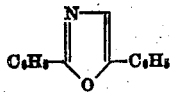

is dissolved in 5 cc. of glacial acetic acid and to the solution is added one of

| | |
|---|---|
| Iodine | gram 0.65 |
| Concentrated hydrochloric acid | cc 2 | in

| | |
|---|---|
| Glacial acetic acid | cc 10 |

A crystalline precipitate is immediately produced and the mixture is heated until this is dissolved, whereupon, after cooling, greenish glittering needles separate.

(2) 0.55 gram of 2.5-diphenyl oxazole is dissolved in 5 cc. of glacial acetic acid and to the solution there is added a solution of

| | |
|---|---|
| Ferric chloride | gram 0.25 |
| Concentrated hydrochloric acid | cc 2 | in

| | |
|---|---|
| Glacial acetic acid | cc 5 |

Brown crystals are immediately precipitated; these are dissolved by heating and on cooling the solution yellow brown needles of melting point 175 to 180° C. are obtained.

(3) 1.1 grams of 2.5-diphenyl oxazole are dissolved in 10 cc. of glacial acetic acid and to the solution there is added a hot solution of

| | |
|---|---|
| Cupric chloride (anhydrous) | gram 0.7 |
| Concentrated hydrochloric acid | cc 1 | in

| | |
|---|---|
| Glacial acetic acid | cc 20 |

There separates immediately a brick red crystalline substance.

(4) 0.9 gram of 2.5-diphenyl oxazole methyl iodide of the formula

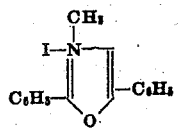

is dissolved in 30 cc. of glacial acetic acid and after cooling 6.25 cc. of an N-solution of bromine in glacial acetic acid are added. An orange body is immediately precipitated which after recrystallization from glacial acetic acid melts at 134° C.

(5) 3 grams of 2-methyl-benzothiazole ethyl iodide of the formula

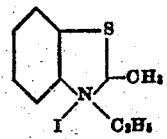

are dissolved in 30 cc. of water and to the solution are added 20 cc. of an N-solution of iodine in potassium iodide. A black substance is immediately precipitated which crystallizes from alcohol in beautiful crystals having a green color.

(6) In a manner similar to that described in Example 5 there are obtained from 3.5 grams of 2-methyl-benzoselenazole ethyl iodide of the formula

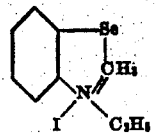

dark crystals having vivid surface lustre.

(7) In a similar manner to that described in Example 5 there is obtained from picoline ethyl iodide of the formula

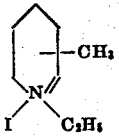

a black oil which crystallizes after some time.

(8) In a similar manner to that described in Example 5 there is obtained from quinaldine ethyl iodide of the formula

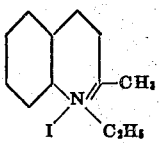

and a solution of iodide in potassium iodide an oil which becomes crystalline after a short time.

The embedding of the substance in a layer and the orientation of the crystals follow the known methods.

A method of preparing polarizing layers is for instance disclosed in the above mentioned U. S. Patent 1,951,664.

What we claim is:

1. A polarizing body comprising a set suspending medium and a mass of particles which are addition compounds constituted of a heterocylic nitrogen compound containing in its molecule only one heterocyclic nitrogen nucleus, said nucleus being a member selected from the group consisting of a heterocyclic nitrogen nucleus having five ring members and a heterocyclic nitrogen nucleus having six ring members, and of a component selected from the group consisting of metal salts, bromine and iodine, said particles being dispersed an immovably embedded in said suspending medium with their polarizing axes oriented in substantial parallelism.

2. A polarizing body comprising a set suspending medium and a mass of particles which are addition compounds constituted of a quaternary ammonium salt of a heterocylic nitrogen compound containing in its molecule only one heterocyclic nitrogen nucleus, said nucleus being a member selected from the group consisting of a heterocylic nitrogen nucleus having five ring members and a heterocyclic nitrogen nucleus having six ring members, and of a compound selected from the group consisting of metal salts, bromine and iodine, said particles being dispersed and immovably embedded in said suspending medium with their polarizing axes oriented in substantial parallelism.

3. A polarizing body comprising a set suspending medium and a mass of particles which are addition compounds constituted of 2.5-diphenyl oxazole methyl iodide and of bromine, said particles being dispersed and immovably embedded in said suspending medium with their polarizing axes oriented in substantial parallelism.

4. A polarizing body comprising a set suspending medium and a mass of particles which are addition compounds constituted of 2-methyl-benzothiazole ethyl iodide and of iodine, said particles being dispersed and immovably embedded in said suspending medium with their polarizing axes oriented in substantial parallelism.

5. A polarizing body comprising a set suspending medium and a mass of particles which are addition compounds constituted of 2-methyl-benzoselenazole ethyl iodide and of iodine, said particles being dispersed and immovably embedded in said suspending medium with their polarizing axes oriented in substantial parallelism.

GUSTAV WILMANNS.
WILHELM SCHNEIDER.